(12) United States Patent
Stier

(10) Patent No.: US 7,716,085 B2
(45) Date of Patent: May 11, 2010

(54) METHODS AND SYSTEMS FOR MASS DATA HANDLING IN A PREFERENCE PROCESSING CONTEXT

(75) Inventor: Andreas Stier, Malsch (DE)

(73) Assignee: SAP AG, Walldorf (DE)

( * ) Notice: Subject to any disclaimer, the term of this patent is extended or adjusted under 35 U.S.C. 154(b) by 1137 days.

(21) Appl. No.: 11/319,367

(22) Filed: Dec. 29, 2005

(65) Prior Publication Data

US 2006/0212335 A1 Sep. 21, 2006

(30) Foreign Application Priority Data

Dec. 29, 2004 (EP) ................................ 04030990

(51) Int. Cl.
G06Q 30/00 (2006.01)
(52) U.S. Cl. .......................................... 705/26; 705/27
(58) Field of Classification Search .................... 705/26, 705/27
See application file for complete search history.

(56) References Cited

U.S. PATENT DOCUMENTS

| | | | | |
|---|---|---|---|---|
| 6,578,068 | B1 * | 6/2003 | Bowman-Amuah | 709/203 |
| 7,047,215 | B2 * | 5/2006 | Seaman et al. | 705/28 |
| 7,359,874 | B2 * | 4/2008 | Seaman et al. | 705/28 |
| 7,389,286 | B2 * | 6/2008 | Holmes et al. | 707/3 |
| 7,475,079 | B2 * | 1/2009 | Uy et al. | 707/100 |
| 7,519,550 | B2 * | 4/2009 | Seaman et al. | 705/29 |
| 2002/0010665 | A1 * | 1/2002 | Lefebvre et al. | 705/31 |
| 2002/0055870 | A1 * | 5/2002 | Thomas | 705/10 |
| 2002/0091536 | A1 * | 7/2002 | Seaman et al. | 705/1 |
| 2002/0099612 | A1 * | 7/2002 | Seaman et al. | 705/26 |
| 2002/0169661 | A1 * | 11/2002 | Demsky et al. | 705/14 |
| 2003/0040964 | A1 * | 2/2003 | Lacek | 705/14 |
| 2003/0069795 | A1 * | 4/2003 | Boyd et al. | 705/22 |
| 2003/0149578 | A1 * | 8/2003 | Wong | 705/1 |
| 2003/0200168 | A1 * | 10/2003 | Cullen et al. | 705/37 |
| 2003/0212595 | A1 * | 11/2003 | Antonucci | 705/14 |
| 2004/0039681 | A1 * | 2/2004 | Cullen et al. | 705/37 |
| 2004/0238620 | A1 * | 12/2004 | Cohagan et al. | 235/380 |
| 2004/0243468 | A1 * | 12/2004 | Cohagan et al. | 705/14 |
| 2004/0243484 | A1 * | 12/2004 | Smith | 705/27 |
| 2005/0033592 | A1 * | 2/2005 | Uy et al. | 705/1 |
| 2005/0060259 | A1 * | 3/2005 | Holmes et al. | 705/40 |
| 2005/0119926 | A1 * | 6/2005 | Turetsky et al. | 705/8 |

(Continued)

OTHER PUBLICATIONS

Timaru, Herals, "Form change confusing", dated Apr. 3, 2000.*

(Continued)

*Primary Examiner*—Mark Fadok
(74) *Attorney, Agent, or Firm*—Finnegan, Henderson, Farabow, Garrett & Dunner, L.L.P.

(57) ABSTRACT

Methods and systems are provided for generating vendor declaration requests in a trade preference processing context. In one implementation, an electronic database is utilized that contains at least one of purchase order data sets and goods receipt data sets that include information about vendors and about goods purchased from the vendors. The electronic database may be accessed to assemble a worklist from the information included in the data sets. The worklist may define a plurality of processing packages associated with individual vendors and indicate the goods purchased from the vendors. The processing packages on the worklist may then be processed in a batch process to generate the vendor declaration requests.

27 Claims, 13 Drawing Sheets

U.S. PATENT DOCUMENTS

| | | | |
|---|---|---|---|
| 2005/0177426 A1* | 8/2005 | Holmes et al. | 705/14 |
| 2006/0041496 A1* | 2/2006 | Amin | 705/37 |
| 2006/0074919 A1* | 4/2006 | Grover et al. | 707/10 |
| 2006/0080347 A1* | 4/2006 | Potts et al. | 707/101 |
| 2006/0085336 A1* | 4/2006 | Seubert et al. | 705/40 |
| 2006/0085450 A1* | 4/2006 | Seubert et al. | 707/100 |
| 2006/0116937 A1* | 6/2006 | Seaman et al. | 705/29 |
| 2008/0091577 A1* | 4/2008 | Holmes et al. | 705/30 |
| 2008/0120198 A1* | 5/2008 | Seaman et al. | 705/26 |

OTHER PUBLICATIONS

Willings, Avalon, "Stock vendor card system stumbles at first hurdle", Daily News, Dec. 9, 1999.*

* cited by examiner

200

```
┌─────────────────────────────────┐
│    PROVIDE ACCESS TO DATABASE   │
│  CONTAINING PURCHASE ORDER AND/OR│
│   GOODS RECEIPT DATASETS WITH   │
│   INFORMATION ABOUT VENDORS AND │
│  GOODS OBTAINED FROM THE VENDORS│
└─────────────────────────────────┘
                                    210
            ↓
┌─────────────────────────────────┐
│  ASSEMBLE WORKLIST FROM DATASETS,│
│  THE WORKLIST DEFINING PROCESSING│
│     PACKAGES ASSOCIATED WITH    │
│   INDIVIDUAL VENDORS AND GOODS  │
│       OBTAINED THEREFREOM       │
└─────────────────────────────────┘
                                    220
            ↓
┌─────────────────────────────────┐
│  PROCESS PROCESSING PACKAGES IN │
│  BATCH PROCESS TO GENERATE VENDOR│
│  REQUESTS LISTING THE GOODS RECEIVED│
│      FROM AN INDIVIDUAL VENDOR  │
└─────────────────────────────────┘
                                    230
```

FIG. 2

| Vendor | Goods | | |
|---|---|---|---|
| | GTS-14003 (Wheels for cranes) | GTS-14014 (Part 1 for motor) | GTS-14012 (Part 1 for crane body) |
| 100084 Vendor 1 (EU) | ○ | | |
| 100088 Vendor 2 (EU) | ○ | | |
| 100089 Vendor 3 (Non-EU) | ○ | ○ | |
| 100084 Vendor 4 (EU) | | | ○ |

FIG. 5

EU: Request Vendor-Based Long-Term Vendor Declaration

| BP Number | Name | LS Group | Ext. Pr.ID | Product Number of Vendor | Product Short Text | Commodity |
|---|---|---|---|---|---|---|
| 100084 | | QZA_GROUP | GTS-14003 | | Wheels for cranes | |
| | | | GTS-14010 | LACK KW PANTONE 4711 | Vinylpolymer color | |
| | | | GTS-14012 | | Part 1 for crane body | |
| 100089 | | | GTS-14003 | | Wheels for cranes | |
| | | | GTS-14010 | VINYLPOLYMERLACK | Vinylpolymer color | |
| | | | GTS-14012 | | Part 1 for crane body | |
| 100090 | | | GTS-14003 | REIFEN 4X4 FANTASTICA | Wheels for cranes | |
| | | | GTS-1 | | | |
| | | | GTS-1 | | | |
| 100096 | | | GTS-1 | | | |
| | | | GTS-1 | | | | abc Company
123 X Street
12345 Y Town

XYZ Company
123 A Street
12345 B Town

Request for a Long-Term Vendor Declaration for Goods of
Preferred Origin in Accordance with Ordinance (EC) 1207/2001

Dear Sir or Madam,

We have to keep origin verifications for all goods that you deliver to
us. We therefore request that you submit a vendor declaration for every
material that you deliver.

For more information about preference agreements, contact your customs
office or the Chamber of Industry and Commerce.

FIG. 10

| Vendor | Goods | | |
|---|---|---|---|
| | GTS-14003 (Wheels for cranes) | GTS-14010 (Vinylpolymer color) | GTS-14012 (Part 1 for crane body) |
| 100096 Vendor 1 (EU) | -- | | |
| 100090 Vendor 2 (EU) | X | | |
| 100089 Vendor 3 (Non-EU) | -- | -- | |
| 100084 Vendor 4 (EU) | | | X |

FIG. 11

METHODS AND SYSTEMS FOR MASS DATA HANDLING IN A PREFERENCE PROCESSING CONTEXT

TECHNICAL FIELD

The present invention generally relates to the field of data processing and methods and systems for efficiently handling large volumes of data. In particular, the invention relates to methods and systems for the automated generation of vendor declaration requests in a trade preference processing context.

BACKGROUND INFORMATION

International trade has grown at an astounding rate over the last few decades. Among the reasons for this growth are globalization, economic liberalization in developing countries, increased mergers and acquisitions, and regional trade agreements like the North American Free Trade Agreement (NAFTA) or the European Union (EU).

As a consequence of the growth in international trade, both businesses and governments around the world are seeking ways to take advantage of the opportunities in international trade. However, with multiple parties involved in each cross-border transaction, complicated tariffs and duties, extensive documentation requirements, and fast-changing legal regulations that shift with each new locality, international trade presents a host of both business chances and business-oriented technological challenges.

While companies are under intense competitive pressure to minimize costs and to reduce cycle times, product sourcing is going global and represents one of the driving forces behind international trade. The increased reliance on global sourcing introduces additional pressure to implement automated systems that provide efficiency for diverse import-export scenarios. In other words, to remain increasingly competitive, companies need to replace manual, time-consuming approaches with automated processes.

One field that permits a higher degree of automation is trade preference processing. Trade preferences are measures that grant preferential customs treatment for goods from certain countries and geographical areas. Trade preferences are of benefit to both the importing and exporting economies. As to imports, trade preferences lower import costs by taking advantage of reduced or zero import duties. As to exports, trade preferences increase the competitiveness because the customer has to pay lower-or no-customs duties.

When goods are exported in an exemplary scenario from a member state of NAFTA to the EU, the EU grants trade preferences in the form of reduced customs duties if the exporter can demonstrate that the goods originate from the NAFTA region. Vice versa, NAFTA grants reduced import duties for imports from the EU if the imported goods are recognized as originating from the EU. As a consequence of trade preferences, companies need to determine and certify the origin of their goods.

While the origin of "simple" goods such as raw materials is rather easy to establish, this is not the case for complex goods like cars or industrial equipment. Such complex goods consist of a large number of individual parts delivered from various vendors (or plants) and thus have different origins. In order to determine whether goods consisting of individual parts are eligible for trade preferences or not, one has to take a look at the origin of each individual part. Generally speaking, goods composed of parts that mainly originate from the EU will be eligible for trade preferences when importing them from the EU into the NAFTA region, whereas goods composed of parts that mainly originate from non-EU countries will not be eligible for such a preferential treatment.

To determine the origin of the individual parts constituting a complex good that is to be exported, the manufacturer of the complex good requests so-called vendor declarations from his vendors that deliver the individual parts. A vendor declaration is a certificate that basically confirms that one or more parts delivered by a particular vendor are originating from a particular region (or, in the alternative, that the parts do not originate from this region) such as the EU. By collecting, aggregating, and evaluating the aggregated vendor declarations received for the individual parts of a complex good, the manufacturer of the complex good can determine whether or not the complex good will be eligible for trade preferences.

For manufacturers of complex goods, the generation of vendor declaration requests is a cumbersome task that often still requires many manual interactions and therefore becomes error-prone. Furthermore, problems result from the fact that larger companies purchase hundreds of thousands of different materials from thousands of different vendors. In principle, a vendor declaration is required for each individual material so that the data to be processed in connection with the generation of vendor declaration requests is immense. The problems resulting from the necessity of mass data handling associated with the generation of vendor declaration request are still aggravated by the fact that in most companies, vendor declarations requests have to be generated at a particular point in time (often once a year when requested from the local customs authority).

There currently exists no satisfactory solution to the mass data handling problems that arise in connection with the generation of vendor declaration requests in larger companies. Existing software and hardware solutions suffer from time out errors, buffer overflows and similar problems.

Accordingly, there is a need for a technique for mass data handling in a preference processing context and, in particular, as far as the generation of vendor declaration requests is concerned.

SUMMARY OF THE INVENTION

According to embodiments of the present invention, methods and systems are provided for generating vendor declaration requests in a trade preference processing context. In accordance with one embodiment, a method is provided that comprises providing access to an electronic database containing at least one of purchase order data sets and goods receipt data sets, the data sets including information about vendors and about goods ordered from the vendors, assembling a worklist from the information included in the data sets, the worklist defining a plurality of processing packages, each processing package being associated with an individual vendor and indicating one or more goods ordered from this vendor, and processing the plurality of processing packages on the worklist in a batch process, wherein during the batch process each processing package is processed to generate a vendor declaration request for a particular vendor, the vendor declaration request listing the one or more goods ordered from this vendor and prompting the vendor to issue a vendor declaration for the one or more listed goods.

Package-based processing approaches consistent with the invention are advantageous as they help to efficiently make use of available memory and processing resources. A batch process helps to control the occupancy of the processing resources (compared to an uncontrolled parallel processing of individual vendor information). This batch-oriented processing, however, does not exclude two or more batch processes from running in parallel. As an example, two parallel batch processes may be implemented, the first batch process processing a first portion of the processing packages on the worklist and the second batch process processing a second portion of the processing packages.

At least one of the data sets in the electronic database (which may be arranged in a dedicated feeder sub-system) and the processing packages (which may be contained in the form of data sets in a database arranged in a preference processing sub-system) may be temporarily blocked as it requires further read and/or write accesses in order to eliminate data inconsistencies (also called "lost updates" or "inconsistent analysis"). According to one implementation, the datasets underlying the processing packages (in either one or both of the feeder and the preference processing sub-system) are individually blocked during the batch process. Preferably, a dataset underlying a particular dataset is only blocked as long as this particular processing package is processed in the batch process. The processing package-based blocking approach helps to prevent data inconsistencies resulting from competing database accesses while at the same time reducing the overall blocking time of individual datasets as much as possible (and thus allowing to efficiently run parallel processes if required).

Methods consistent with the present invention may further comprise cleaning a memory from data (such as tables) only temporarily required for generating the current vendor declaration request before processing a subsequent processing package from the worklist. This approach ensures that the available memory resources will be efficiently utilized. In scenarios in which the memory allocated to a user who logs in and starts the request generation process is limited, the consecutive memory cleaning steps during the batch process can be particularly useful.

The purchase order data sets and/or the goods receipt data sets may additionally include temporal information. The temporal information can be indicative of a relevant date for a purchase order and/or a goods receipt, such as the date the purchase order or the goods receipt was generated, the date the purchase order or the goods receipt was sent to the vendor, or the like. With data sets including such kind of temporal information, the step of assembling the worklist may comprise the sub-steps of evaluating the relevant dates included in the data sets, and considering an individual data set for the purpose of generating the worklist only if the relevant date included therein is newer than a predefined date (e.g., newer than the first of January of the current or the preceding year, or newer than an arbitrarily chosen date).

The purchase order data sets and goods receipt data sets may be created in various ways. In one exemplary scenario, the data sets are created by way of online transaction processing (OLTP). OLTP is an approach common to many Enterprise Resource Planning (ERP) systems because it permits an efficient handling of high numbers of similar transactions that occur each day in a particular context. In an OLTP or any other processing scenario, methods consistent with the present invention may further comprise the step of continuously updating the electronic database upon creation of at least one of a new purchase order data set and a new goods receipt data set.

In one embodiment, the worklist is discontinuously assembled (e.g., once or only a few times a year) upon receipt of an assembling request signal. Accordingly, the discontinuous assembling of the worklist may lead, in particular in OLTP environments, to high amounts of data that have to be processed in a single run. The assembling request signal may be generated in several ways. According to one implementation, a control element is provided on a graphical user interface such that the control element can be activated by an input device (e.g., a keyboard or a computer mouse) to generate the assembling request signal. According to another implementation, the assembling request signal is generated automatically at one or more predefined points in time (e.g., according to a previously created schedule).

The assembly of the worklist and/or the processing of the plurality of processing packages may be controlled dependent on control data. These control data may, for example, control a filtering or selection of relevant data sets in the electronic database that are to be taken into account when generation the worklist (e.g., based on temporal, regional or any other restrictions). Additionally, or in the alternative, the control data may control the processing of the processing packages by specifying particular processing mechanisms or the like.

According to one embodiment, methods consistent with the present invention further comprise sending each vendor declaration request to the vendor associated with the request. The vendor declaration may be sent electronically via a computer network, via mail, or in any other form dependent on (e.g., vendor specific) preference settings.

The requested vendor declarations may be received in response to the vendor declaration requests and specify preference processing information for the goods listed in the vendor declaration requests. Next, a comparison value for a complex good composed of the individual goods received from the vendors may be calculated. Preferably, the comparison value is calculated taking into account at least one of the preference processing information specified in the vendor declarations and an ex-works price of the individual goods received from the vendors.

Methods consistent with the present invention may additionally comprise comparing the comparison value with an ex-works price of the leading good and setting a preference flag if the ex-works price is higher than the comparison value. In this case, a preference certificate for the leading good could be issued if the preference flag is set.

According to a further embodiment of the invention, a method is provided for automatically selecting data sets for batch processing in a trade preference processing context. The method may comprise continuously updating an electronic database of an OLTP feeder system with data sets including information about vendors and about goods ordered from the vendors, selecting individual data sets in the electronic database to assemble processing packages from the information included in the selected data sets, each processing package being indicative of an individual vendor and one or more goods ordered from this vendor, and processing the plurality of processing packages in a batch process, wherein during the batch process each processing package is processed to generate a vendor declaration request for a particular vendor, the vendor declaration request listing the one or more goods ordered from this vendor and prompting the vendor to issue a vendor declaration for the one or more listed goods.

The above-described method preferably further comprises selecting the data sets in accordance with one or more previously defined selection criteria including at least one of a relevant data set date and a regional constraint. The regional constraint specifies, for example, that the vendor declarations are required for exporting into a particular region such as the EU or NAFTA.

In order to improve the efficiency of memory usage, memory space may be reserved (or allocated) for the processing of at least one of the worklist and an individual processing package on the worklist. In this case, the memory space that has been reserved, for example, for the processing of a processing package, may then be de-allocated before processing the next processing package.

As indicated above, the data sets in the electronic database may also include temporal information. The step of assembling the worklist may then comprise evaluating the temporal information included in the data sets (e.g., considering an individual data set for the purpose of generating the worklist only if the temporal information included in this data set meets a predefined criterion such as a threshold condition).

According to a still further embodiment of the invention, a computer program product is provided. The computer program product may comprise a first program code portion for accessing an electronic database containing at least one of purchase order data sets and goods receipt data sets, the data sets including information about vendors and about goods ordered from the vendors. The computer program product may also comprise a second program code portion for assembling a worklist from the information included in the data sets, the worklist defining a plurality of processing packages, each processing package being associated with an individual vendor and indicating one or more goods ordered from this vendor, and a third program code portion for processing the plurality of processing packages on the worklist in a batch process, wherein during the batch process each processing package is processed to generate a vendor declaration request for a particular vendor, the vendor declaration request listing the one or more goods ordered from this vendor and prompting the vendor to issue a vendor declaration for the one or more listed goods. In one embodiment, the computer program product is preferably stored on a computer-readable recording medium.

According to a still further embodiment of the invention, a system for generating vendor declaration requests in a trade preference processing context is provided. The system comprises a feeder sub-system with an electronic database containing at least one of purchase order data sets and goods receipt data sets, the data sets including information about vendors and about goods ordered from the vendors and a preference processing sub-system coupled to the feeder sub-system. The processing sub-system may comprise a database for storing a worklist derived from the information included in the data sets, the worklist defining a plurality of processing packages, each processing package being associated with an individual vendor and indicating one or more goods ordered from this vendor, and a processor for processing the plurality of processing packages on the worklist in a batch process, wherein during the batch process each processing package is processed to generate a vendor declaration request for a particular vendor, the vendor declaration request listing the one or more goods ordered from this vendor and prompting the vendor to issue a vendor declaration for the one or more listed goods. In one embodiment, the feeder sub-system may be an ERP system operable in an OLTP mode.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 2 is a flowchart illustrating an exemplary method, consistent with an embodiment of the present invention;

FIG. 5 schematically shows an exemplary table associating individual goods with individual vendors, consistent with an embodiment of the present invention;

FIG. 10 schematically shows an exemplary generation of a printed vendor declaration request generated during worklist processing, consistent with an embodiment of the present invention;

FIG. 11 schematically shows the completed table of FIG. 5 after the vendor declarations have been received, consistent with an embodiment of the present invention;

DESCRIPTION OF THE EMBODIMENTS

In the following description, for purposes of explanation and limitation, specific details are set forth, such as particular processing scenarios, in order to provide a thorough understanding of the present invention. It will be apparent to one skilled in the art that the present invention may be practiced in other embodiments that depart from these specific details. Moreover, those skilled in the art will appreciate that the functions explained herein below may be implemented using software functioning in conjunction with a programmed micro processor or general purpose computer, and/or using any other computing devices or computing systems. It will also be appreciated that while the current invention is primarily described with reference to methods, it may also be embodied in computer program products or in systems comprising a computer processor and a memory coupled to the processor, the memory being encoded with one or more programs that may perform the methods disclosed herein.

Figure 1:
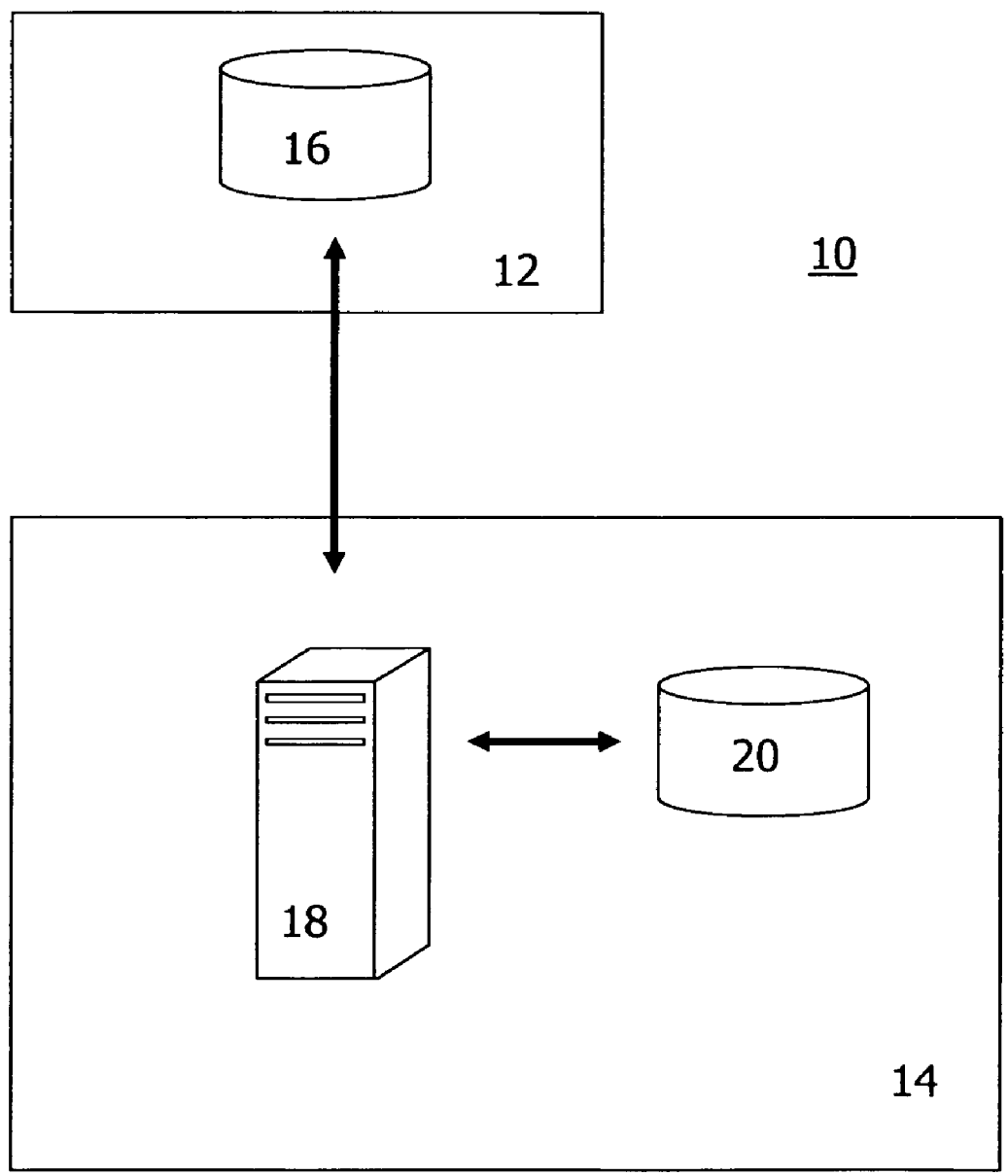
FIG. 1 is a block diagram illustrating an exemplary system, consistent with an embodiment of the present invention.

With reference to FIG. 1, an exemplary system 10 is illustrated for generating vendor declaration requests in a trade preference processing context. The system 10 comprises a feeder sub-system 12 and a preference processing sub-system 14 coupled to the feeder sub-system 12. The feeder sub-system 12 includes an electronic database 16 containing a plurality of purchase order data sets and/or goods receipt data sets. The data sets in the electronic database 16 may include information about vendors and about goods ordered from the vendors.

The processing sub-system 14 comprises a processor 18 having access to the database 16 of the feeder sub-system 12 and to a further database 20 in the processing sub-system 14. The processor 18 may create a worklist from the data sets in the database 16 and store the worklist in the database 20 of the processing sub-system 14. Once the worklist has been prepared and stored in the database 20, the processor 18 processes the worklist in a batch process, such as will be described in detail below with reference to the flowchart to FIG. 2.

In one embodiment, the feeder sub-system 12 shown in FIG. 1 is an Enterprise Resourced Planning (ERP) system operating in an Online Transaction Processing (OLTP) mode. As an example, the feeder sub-system 12 may be the R/3 platform available from SAP AG of Walldorf, Germany. The R/3 platform may host a transaction-based Supply Chain Management (SCM) or Material Management (MM) application that continuously generates the purchase order data sets and/or goods receipt data sets for being stored in the database 16. The processing sub-system 14 may run on the same or on a different platform than the feeder sub-system 12. The application running on the platform of the processing sub-system 14 may be the Global Trade Services (GTS) application of SAP AG with additional trade preference processing capabilities consistent with embodiments of the present invention. Communication between the feeder sub-system 12 and the processing sub-system 14 may be performed via EDI messaging and/or an XML interface (not shown) and/or via Remote Function Call (RFC).

With reference to FIG. 2, a process flow diagram 200 is illustrated relating to an exemplary method for generating vendor declaration requests in a trade preference processing context. The method may be implemented in the system 10 shown in FIG. 1 or in any other system. In a preferred implementation, the method is performed by individual program code portions constituting a computer program product that controls the operation of the processor 18 shown in FIG. 1.

The method commences, at step 210, with providing access to the database 16 of the feeder sub-system 12. As has been explained above, the database 16 may contain at least one of purchase order data sets and goods receipt data sets with information about vendors and about goods ordered from the vendors. Additionally, the data sets in the database 16 may include temporal information indicative of a relevant date underlying a purchase order or a goods receipt for which a data set is stored in the database 16.

In a next step 220, the processor 18 accesses the database 16 to assemble a worklist from the information included in the data sets. The worklist may define a plurality of individual processing packages. Each processing package can be associated with an individual vendor and indicates one or more goods ordered from this vendor. Step 220 may include a selection operation in relation to the data sets stored in the database 16. In other words, the processor 18 may be configured to select only data sets that fulfill certain selection criteria from the database 16. The selection criteria may include one or more predefined dates. In such a scenario, step 220 may include the sub-steps of evaluating the relevant dates in the data sets stored in the database 16, and considering an individual data set (i.e., the vendor and/or goods referenced therein) for the purpose of generating the worklist only if the relevant date included in this data set is newer than the predefined date.

In a further step 230, the plurality of processing packages defined in the worklist are consecutively read from the database 20 and processed in a batch process. During the batch process, each processing package is processed to generate a vendor declaration request for a particular vendor. The vendor declaration request lists the one or more goods ordered from this vendor and prompts the vendor to issue a vendor declaration for the one or more listed goods.

Figure 3:
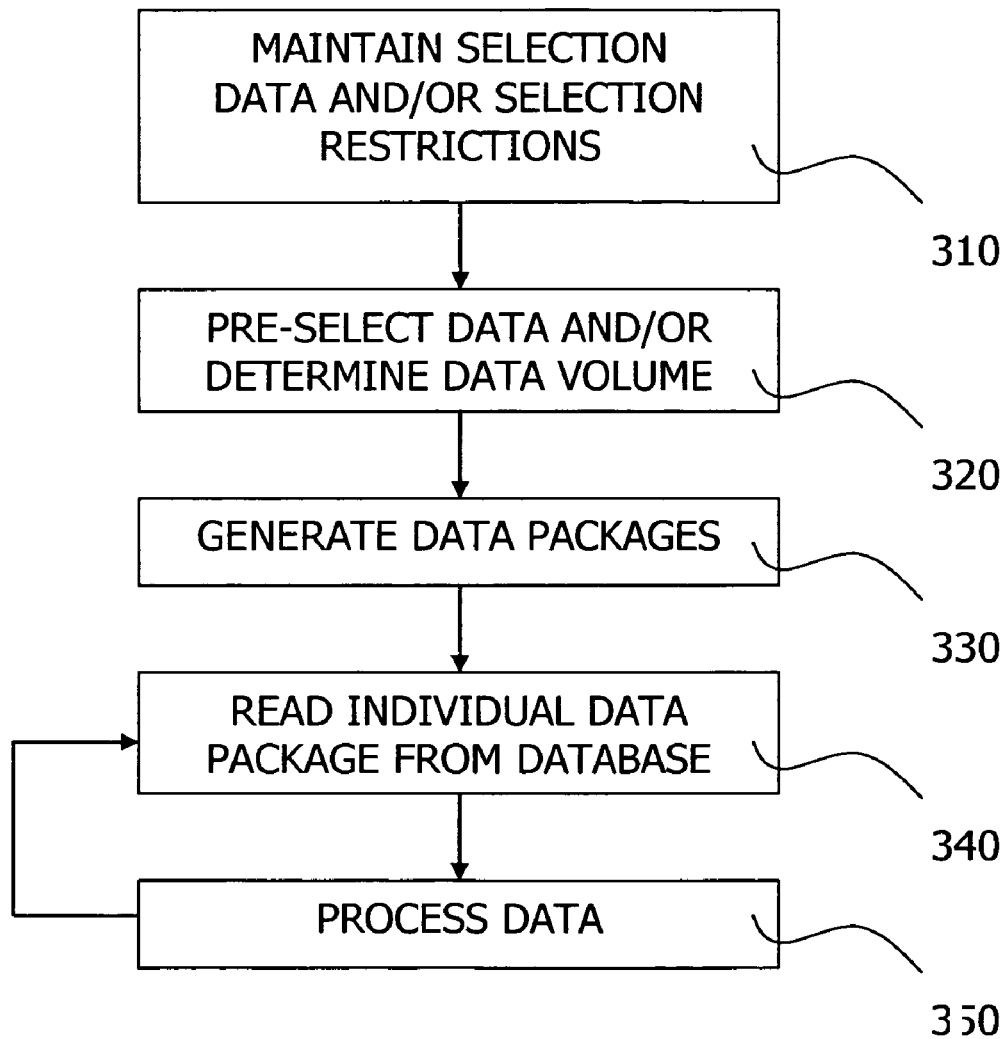
FIG. 3 is another flowchart illustrating a further exemplary method, consistent with an embodiment of the present invention.

FIG. 3 shows a process flow diagram 300 of a further exemplary method, consistent with an embodiment of the present invention, that can be combined with the exemplary method shown in FIG. 2. The method of FIG. 3 will be explained with reference to the system 10 shown in FIG. 1, but it can be implemented in other systems also.

In a first step 310, selection data and/or selection restrictions are maintained in the processing sub-system 14. To this end, a separate database (not shown in FIG. 1) may be provided for storing and maintaining the selection data and/or selection restrictions. The selection data and/or selection restrictions maintained in step 310 relate to the data sets to be automatically read (or selected) from the database 16 in the feeder sub-system 12.

In a next step 320, data are pre-selected from the data sets stored in the database 16, and individual processing packages are generated of step 330. The individual processing packages may include vendor information (e.g., names, addresses and/or identifying numbers of the individual vendors), as well as information about the goods (such as a brief description of the goods or goods identifiers) ordered from the vendors. The processing packages can be stored in the database 20 or in any other database and permit the generation of a worklist for a batch process. In one embodiment, the pre-selection step 320 and the processing package generation step 330 are performed only once and preferably without any dialog-type or other type of human interaction. Step 320 thus allows to determine the data range (or data volume) for the subsequent batch process.

Once the processing package (and the worklist) have been generated in step 330, the processor 18 reads the individual processing packages from the database 20 (or any other database) in a certain order defined by the worklist (step 340) and processes the data contained therein (step 350). During the processing step 350, the vendor declaration request for a particular vendor identified in the processing package read in step 340 is generated and electronically stored in the database 20 or any other database of the processing sub-system 14. Once the processing package for an individual vendor has been processed, and the vendor declaration request for this vendor has been generated, this processing package is flagged in the worklist and the method loops back from step 350 to step 340 and reads the next (or any non-flagged) processing package identified on the worklist. This package-by-package processing may be repeated until all pre-selected data (i.e., the whole worklist) have been processed.

Figure 4A:
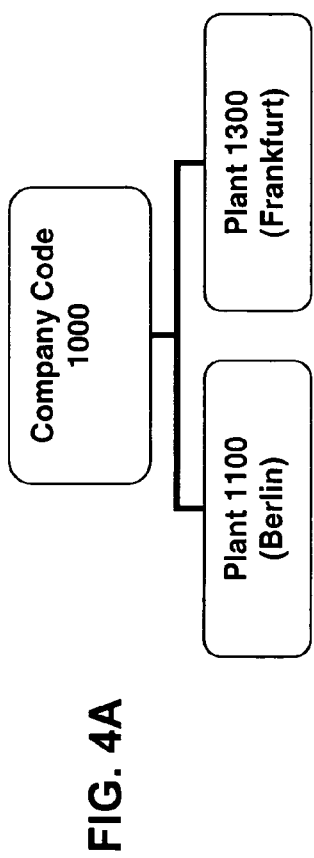
FIGS. 4A and 4B schematically show an exemplary company structure and an exemplary hierarchically structured bill of material, consistent with an embodiment of the present invention.

In the following description, an exemplary trade preference processing approach will be described with reference to a complex good in the form of a crane composed of individual parts, such as a chassis, wheels, and so on. As shown in the example of FIG. 4A, assume the crane is manufactured by a German company having a first plant in Berlin and a second plant in Frankfurt. Both plants may have their own "feeding sub-system" that communicates with a single central preference processing sub-system. In both plants, individual sub-units of the crane are manufactured. This becomes apparent from the hierarchically structured bill of material (BOM) of the crane shown in FIG. 4B.

Figure 4B:
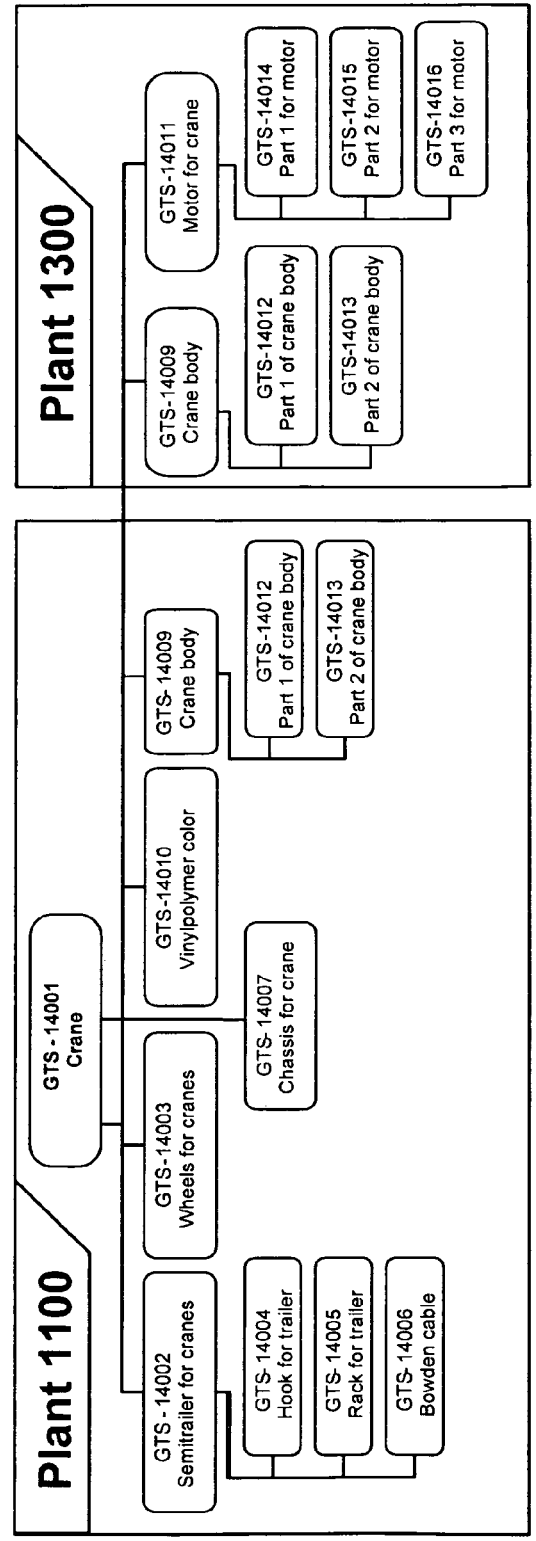

With reference to FIG. 4B, the crane (with the material no. GTS-14001) is composed of a plurality of sub-units with individual material numbers. As shown in FIG. 4B, the crane body (material no. GTS-14009) is assembled both in Frankfurt (plant 1300) and in Berlin (plant 1100). The motor of the crane (material no. GTS-14011) is assembled only in the Frankfurt plant, whereas the remaining sub-units like the semi-trailer are assembled in the Berlin plant. The crane body consist of two individual parts, namely of part 1 with material no. GTS-14012 and of part 2 with material no. GTS-14013. Each part of the crane body may again consist of several sub-parts and so on.

The individual parts (or goods) constituting the crane are received from different vendors as shown in the exemplary table of FIG. 5. The crane wheels with material no. GTS-14003, for example, are received from three different vendors, namely vendor 1 (vendor ID 100084), vendor 2 (vendor ID 100088) and vendor 3 (vendor ID 100089). The companies of vendor 1 and 2 are located in the EU, whereas vendor 3 is a non-EU company. The table of FIG. 5 also shows the vendors for two further parts of the crane, and could be extended to all parts shown in FIG. 4B.

If the German crane manufacturer with plants in Berlin and Frankfurt (as shown in FIG. 4A) exports the crane to a customer in a member state of NAFTA, the German crane manufacturer may benefit from trade preferences, which will decrease the costs for the customer and thus render the crane manufacturer more competitive.

Figure 6:
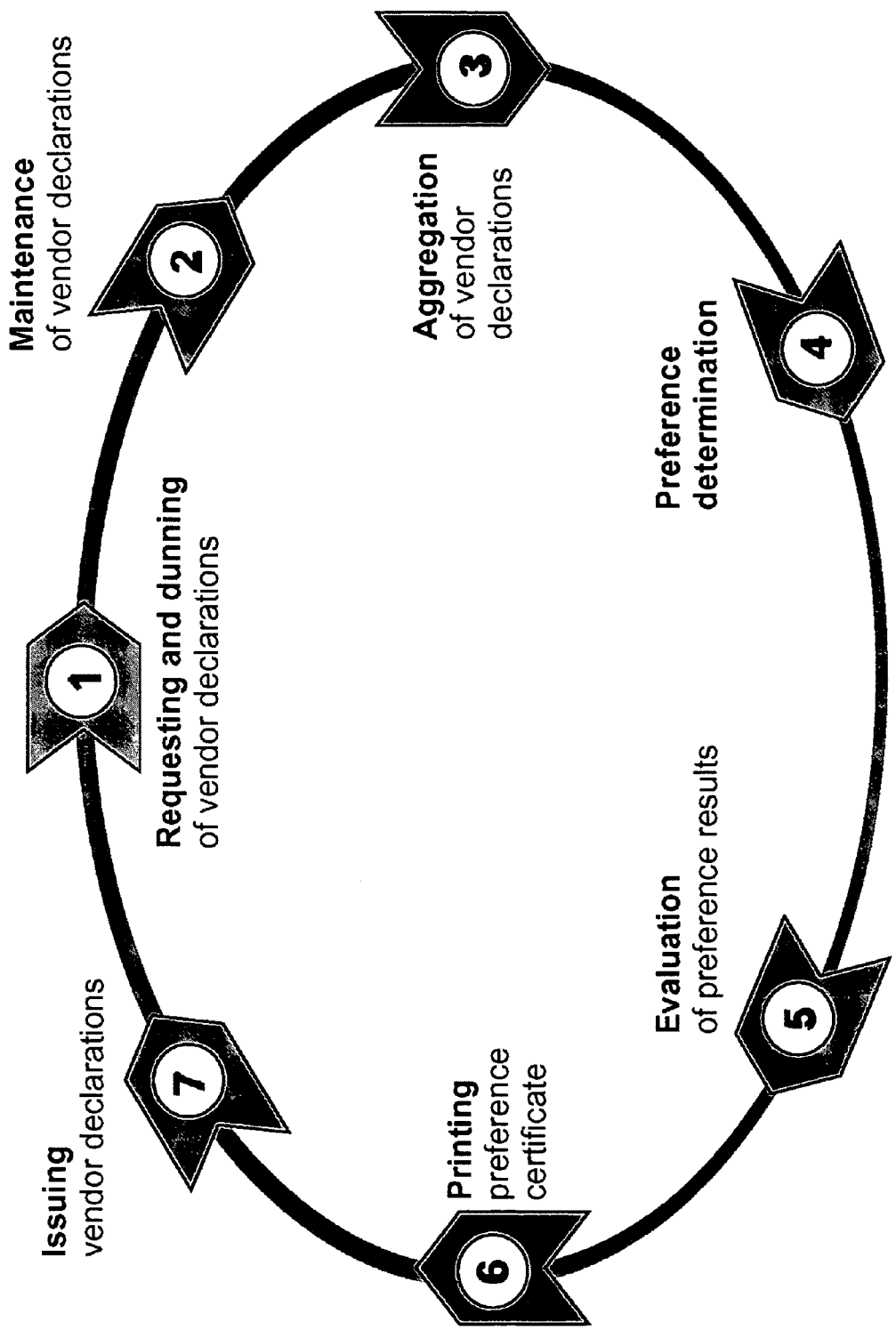
FIG. 6 schematically shows exemplary individual steps of a trade preference processing scenario, consistent with an embodiment of the present invention.

In order to determine whether the crane is eligible for preference treatment or not, trade preference processing, such as that shown in the flowchart of FIG. 6, has to be preformed. Briefly, trade preference processing starts with a first step in which vendor declarations are requested and, if required, dunned, as will be described in more detail below. In a second step, the requested vendor declarations are received by the crane manufacturer and maintained. The vendor declarations are aggregated in a third step, and in a fourth step a threshold value for preference eligibility is determined.

As further shown in FIG. 6, in a fifth step, the results of the preference determination of step 4 are evaluated. To this end, the threshold value determined in step 4 is compared with the ex-works price of the crane. If the ex-works price is greater than or equal to the threshold value, the crane is eligible for preferential treatment. In this case, a preference certificate may be printed in step 6. The preference certificate may be used as a proof that the crane is eligible for preferential treatment when passing through the customs. In a final, seventh step, the crane manufacturer himself assumes role of a vendor and issues a vendor declaration for the crane to the customer. Here, the cycle ends and may be repeated, if required.

In the following, the vendor declaration requesting step shown in FIG. 6 will be described in more detail with reference to FIGS. 7 to 13.

Figure 7:
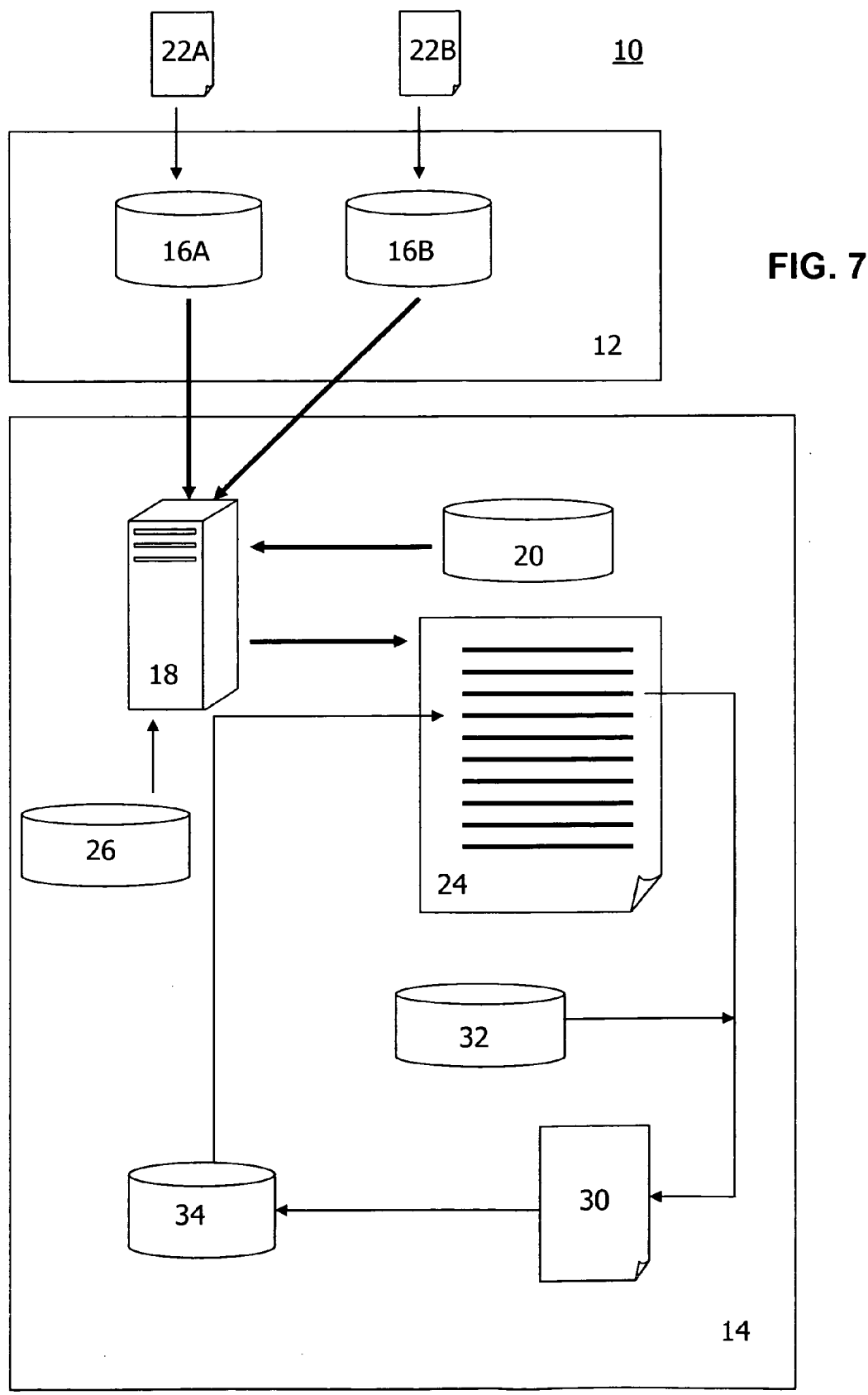
FIG. 7 schematically shows a combined exemplary system and method, consistent with an embodiment of the present invention.

FIG. 7 shows a schematic diagram illustrating an exemplary system and method for generating vendor declaration requests according to step 1 of FIG. 6. In the embodiment shown in FIG. 7, the same reference numbers as in FIG. 1 have been used for corresponding elements.

The feeder sub-system 12 and the processing sub-system 14 shown in FIG. 7 operate asynchronously. In the embodiment shown in FIG. 7, the feeder sub-system 12 comprises a purchase order database 16A and a goods receipt database 16B. These databases 16A and 16B are continuously updated with purchase order data sets 22A and goods receipt data sets 22B, respectively. The data sets 22A and 22B are continuously created by the manufacturer's OLTP components (not shown) running on the platform the feeder sub-system 12.

The processor 18 in the preference processing sub-system 14 starts to access the databases 16A and 16B (with the purpose of generating a worklist 24) in response to an assembling request signal. The assembling request signal may have been generated by an automatic scheduler at a predefined point in time (e.g., at a predefined date). Alternatively, a control element for initiating the generation of the assembling request signal may be generated on a graphical user interface, such that upon activation of the control element (e.g., by operating a keyboard or by a mouse click) the assembling request signal is generated.

Once the assembling request signal is received by the processor 18, the processor 18 accesses databases 16A and 16B to selectively load vendor-related and goods-related data from the data sets 22A and 22B stored in the databases 16A and 16B. The data loaded from the databases 16A and 16B may be stored by the processor 18 in the form of individual processing packages in the database 20, that also contains the worklist 24 with references to the individual processing packages. The vendor-related and goods-related data loaded from the databases 16A and 16B are designated as master data. Furthermore, master data loaded by the processor 18 from the feeder sub-system 12 may include one or more bills of materials (like the BOM shown in FIG. 4B) and customer-related data. The master data loaded from the feeder sub-system 12 are at least in part stored in the database 20 of the preference processing sub-system 14.

The master data are selectively loaded from the feeder sub-system 12 as defined by selection criteria stored in a further database 26 of the processing sub-system 14. The selection criteria may relate to the particular data set type to be loaded (e.g., the loading may be restricted to goods receipt data sets), a threshold date for the data sets to be loaded, and/or region/country specific limitations concerning the data sets to be loaded.

Figure 8:
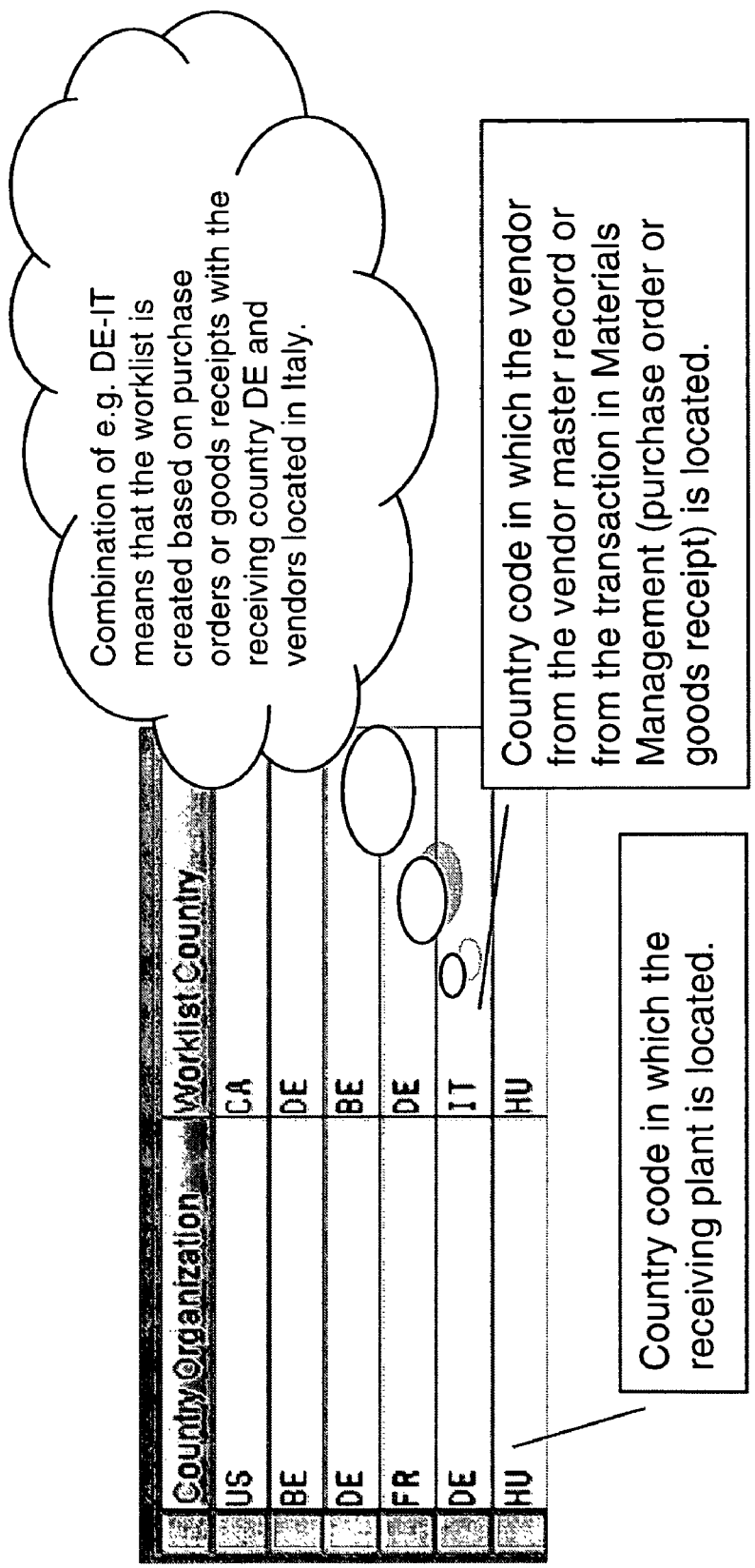
FIG. 8 schematically shows an exemplary selection criterion, consistent with an embodiment of the present invention.

FIG. 8 shows an exemplary region/country-specific selection criteria for the data sets to be loaded by the processor 18, consistent with an embodiment of the present invention. The table of FIG. 8 allows to select data sets with particular country combinations. The combination of DE (country organization)-IT (worklist country) means for example that the worklist is created based on purchase order data sets and/or goods receipt data sets with the receiving country Germany and vendors located in Italy.

From the master data read by the processor 18, a worklist 24 and individual processing packages are generated. Generally speaking, the data sets read from the databases 16A and 16B in the feeder sub-system 12 are evaluated in relation to the individual vendors and the individual goods appearing in the data sets. The processor 18 processes the vendor information and the goods information thus derived from the data sets and creates individual processing packages. Each processing package lists for a particular vendor all the goods obtain from this vendor. Each processing package may include further information required for the generation of vendor declaration requests.

Figure 9:
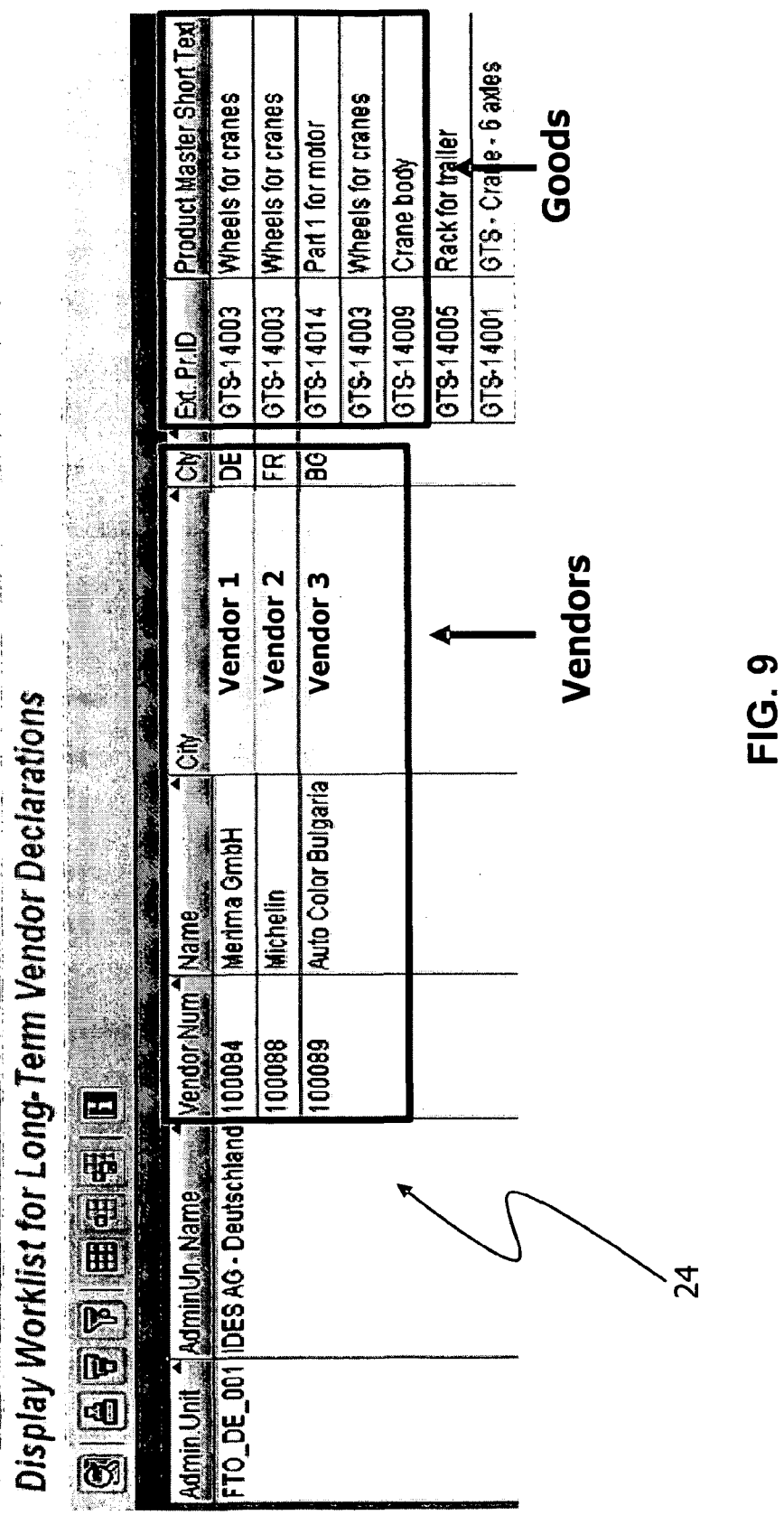
FIG. 9 schematically shows an exemplary portion of a worklist generated in accordance with an embodiment of the present invention.

Once a processing package has been generated for each vendor that could be identified in the data sets read from the databases 16A and 16B, the worklist 24 is created. FIG. 9 shows an exemplary portion of such a worklist 24 for the vendors 1, 2 and 3 of the table shown in FIG. 5. Generally, the worklist lists the individual processing packages in a user-defined order and specifies for each vendor certain vendor-specific information like the vendor number, and, in particular, the individual goods ordered from the vendor.

Once the worklist 24 has been generated, the processor 18 may start a batch process during which for each individual processing package specified in the worklist, a vendor declaration request 30 as shown in FIGS. 7 and 10 is generated. During the processing of a particular processing package listed on the worklist 24, the processor 18 requires auxiliary data (e.g., a text block or a letter format for creating the vendor declaration request). This auxiliary data is read from a further database 32.

As soon as the vendor declaration request 30 has been generated, it is stored in a database 34, or it is immediately transferred (e.g., as an electronic message via a computer network or by mail) to its recipient. Before processing the next processing package listed in the worklist 24, the processor 18 cleans its memory from data only temporarily required for generating the current vendor declaration request 30. Such a memory cleaning step is of particular importance if the memory space allocated to an individual user of the processing sub-system 14 is limited, and/or if the processor 18 is configured to reserve memory space for processing of an individual processing package on the worklist.

Once all processing packages on the worklist 24 have been processed and the vendor declaration requests stored in database 34 have been sent to their recipients, the processor 18 monitors the receipt of the requested vendor declarations and duns individual vendors who do not return their vendor declarations in time. The received vendor declarations are maintained, managed and archived in step 2 of the cycle shown in FIG. 6.

From the returned vendor declarations, the table shown in FIG. 5 can be completed as shown in FIG. 11. A cross "X" means that a particular good is eligible for preferential treatment, whereas a minus sign "−" denotes a material that is not eligible for preferential treatment. If a product partly is eligible for preferential treatment, a detailed negative vendor declaration can be provided by the vendor. In this detailed vendor declaration, the vendor may quote a value of the one or more components that are not eligible for preferential treatment.

Once the table shown in FIG. 11 has been completed, the aggregation step (step 3 of FIG. 6) is performed. If there are several vendor declarations for the same goods (first column in FIG. 11), the aggregation process is used to specify the particular declaration that should be used for determining the preferential origin. Often, the "worst case" declaration (that is, the least favorable vendor declaration for a particular good) is used. This approach is further illustrated in FIG. 11.

After the aggregation has been performed, preference determination (step 4 in FIG. 6) starts. In the course of preference determination, a so called threshold value for preferential eligibility is determined. This determination is based on preference rules that need not be considered in more detail here.

Figure 12:
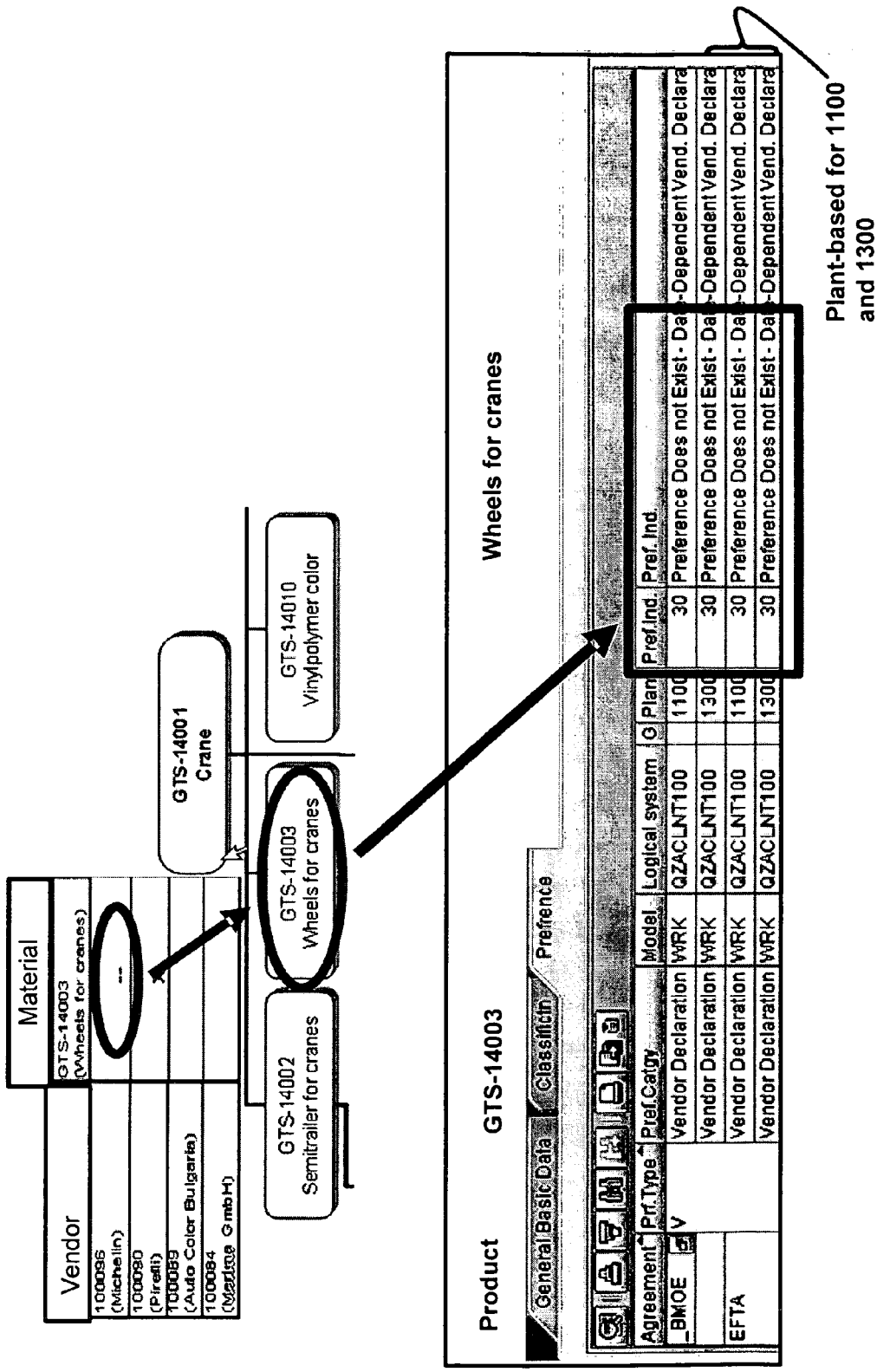
FIG. 12 schematically shows a further exemplary step of trade preference processing after the vendor declarations have been received, consistent with an embodiment of the present invention.
Figure 13:
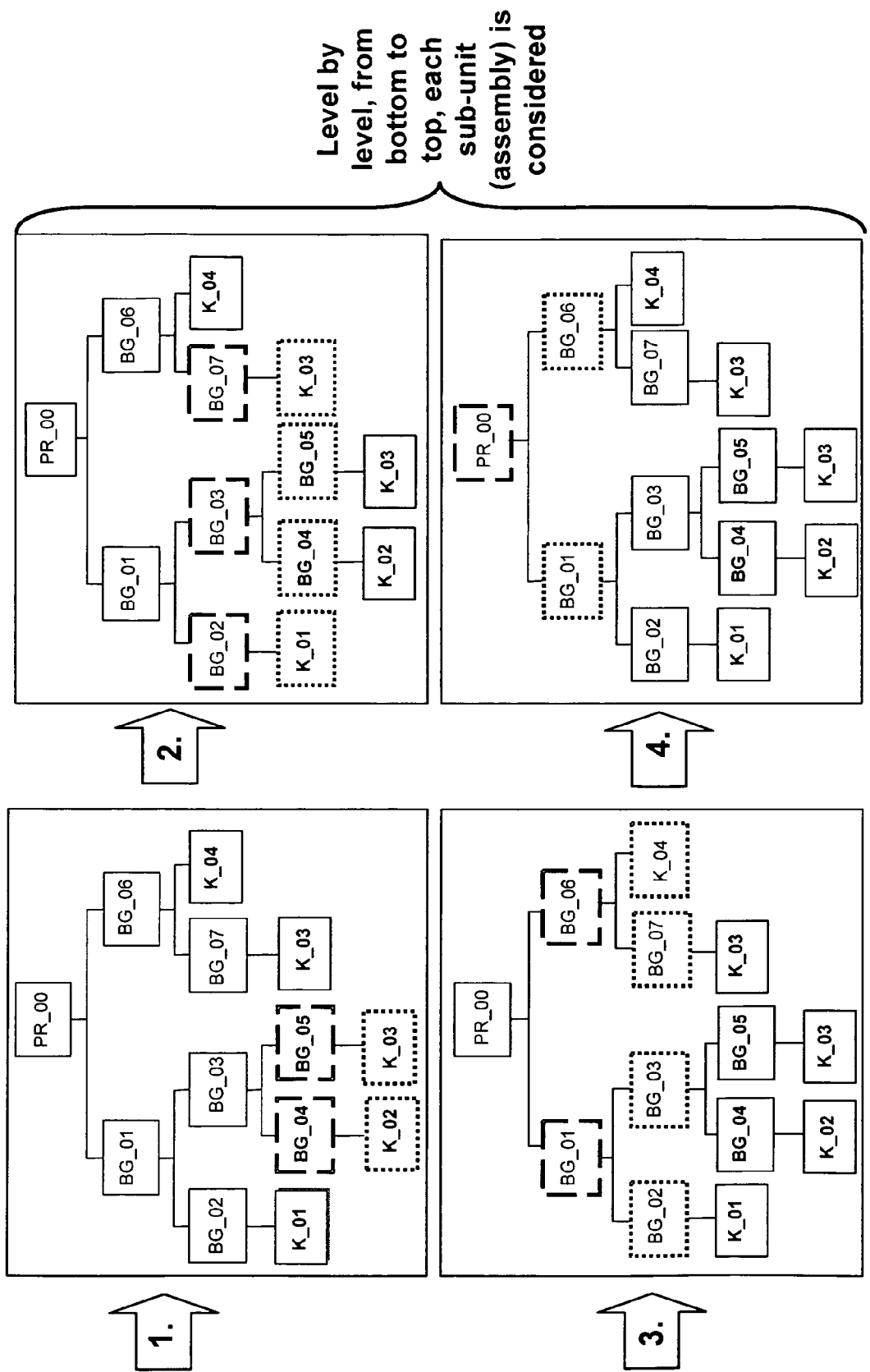
FIG. 13 schematically shows an exemplary determination of whether or not a certain complex good is eligible for preferential treatment, consistent with an embodiment of the present invention.

FIG. 12 shows an exemplary bottom-up preference determination approach for an exemplary BOM structure, consistent with an embodiment of the present invention. Starting with the parts (or goods) on the bottom level, it is determined based on the content of the respective vendor declaration if a particular part is eligible for preferential treatment and, if this is the case, a certain value for this part is established taking into account preference rules. This process may be repeated on every level until the threshold value for the final product on the highest level is obtained (cf. FIG. 13).

In the fifth step of the cycle shown in FIG. 6, the threshold value determined for the crane in step 4 is compared with the ex-works price of the crane according to the sales documents. If the ex-work price is higher than the threshold value, the crane is eligible for preferential treatment. In this case a preference certificate may be printed in step 6, which serves as proof that the crane is eligible for preferential treatment. In the final, seventh step, the crane manufacturer himself assumes the role of a vendor and issues a vendor declaration for the crane to the customer.

The approach outlined above for generating the vendor declaration requests is very efficient with regards to the computational load and the occupied memory resources. One reason for this efficiency is the fact that the data sets are not selected individually and manually, but the data selection encompasses the full range of data from the feeder sub-system that needs to be processed. Accordingly, the feeder sub-system needs to be accessed only once. Moreover, the generation of processing packages and the processing of these packages in a batch process further improves the overall performance of the request generation.

While the current invention has been described with respect to particular embodiments (including certain system arrangements and certain orders of steps within various methods), those skilled in the art will recognize that the current invention is not limited to the specific embodiments described and illustrated herein. Therefore, while the present invention has been described in relation to specific embodiments, it is to be understood that this disclosure is only illustrative. Accordingly, it is intended that the invention be limited only be the scope of the claims appended hereto.

What is claimed is:

1. A method of data processing, comprising:
providing access to an electronic database containing at least one of purchase order data sets and goods receipt data sets, the data sets including information about vendors and about goods obtained from the vendors;
assembling a worklist from the information included in the data sets, the worklist defining a plurality of processing packages, each processing package being associated with an individual vendor and indicating one or more goods obtained from the vendor; and
processing the plurality of processing packages of the worklist in a batch process using a processor, wherein during the batch process each processing package is processed to generate, in a trade preference processing context, a vendor declaration request for a particular vendor, the vendor declaration request listing the one or more goods obtained from the vendor and prompting the vendor to issue a vendor declaration for the one or more listed goods.

2. The method of claim 1, further comprising:
blocking competing access to at least one of the data sets underlying a particular processing package while the particular processing package is processed in the batch process.

3. The method of claim 1, further comprising:
cleaning a memory from data only temporarily required for generating a current vendor declaration request before processing a subsequent processing package from the worklist.

4. The method of claim 1, wherein at least one of the purchase order data sets and the goods receipt data sets additionally include temporal information, the temporal information being indicative of a relevant date for a purchase order or a goods receipt, respectively.

5. The method of claim 4, wherein assembling of the worklist comprises:
evaluating a relevant date included in the data sets; and
considering an individual data set for the purpose of generating the worklist only if the relevant date included therein is newer than a predefined date.

6. The method of claim 1, further comprising:
creating at least one of purchase order data sets and goods receipt data sets by way of online transaction processing (OLTP).

7. The method of claim 6, further comprising:
continuously updating the electronic database upon creation of at least one of a new purchase order data set and a new goods receipt data set.

8. The method of claim 1, further comprising:
evaluating user-specified control data during at least one of assembling of the worklist and processing of the plurality of processing packages.

9. The method of claim 8, wherein assembling the worklist comprises:
selecting data sets from the database in accordance with the control data; and
assembling the worklist based on information contained in the selected data sets.

10. The method of claim 1, further comprising:
sending each vendor declaration request to the vendor associated with the request.

11. The method of claim 1, further comprising:
receiving vendor declarations in response to the vendor declaration requests, the vendor declarations specifying preference processing information for the goods listed in the vendor declaration requests.

12. The method of claim 11, further comprising:
calculating a comparison value for a complex good composed of the individual goods obtained from the vendors, wherein the comparison value is calculated taking into account the preference processing information specified in the vendor declarations.

13. The method of claim 12, further comprising:
additionally taking into account a price of the individual goods obtained from the vendors when calculating the comparison value.

14. The method of claim 13, further comprising:
comparing the comparison value with the price of the complex good; and generating a preference certificate for the complex good dependent on the result of the comparison.

15. A method for data processing, comprising:
continuously updating an electronic database of an online transaction processing (OLTP) feeder system with data sets including information about vendors and about goods obtained from the vendors;
selecting individual data sets in the electronic database to assemble a plurality of processing packages from the information included in the selected data sets, each processing package being indicative of an individual vendor and one or more goods obtained from the vendor; and
processing the plurality of processing packages in a batch using a processor, wherein during the batch process each processing package is processed to generate, in a trade preference processing context, a vendor declaration request for a particular vendor, the vendor declaration request listing the one or more goods obtained from the vendor and prompting the vendor to issue a vendor declaration for the one or more listed goods.

16. The method of claim 15, further comprising:
selecting the data sets in accordance with one or more previously defined selection criteria including at least one of a relevant data set date and a regional constraint.

17. The method of claim 15, further comprising:
reserving a memory space for the processing of at least one of the worklist and an individual processing package on the worklist.

18. The method of claim 15, further comprising:
releasing a memory space that has been reserved for the processing of a processing package before processing the next processing package.

19. The method of claim 15, wherein the data sets in the electronic database additionally include temporal information.

20. The method of claim 19, wherein assembling of the worklist comprises: evaluating the temporal information included in the data sets.

21. The method of claim 20, wherein assembling of the worklist comprises: considering an individual data set for the purpose of generating the worklist only if the temporal information included in the data set meets a predefined criterion.

22. The method of claim 21, wherein the predefined criterion is a temporal threshold.

23. A computer program product comprising
a first program code portion for accessing an electronic database containing at least one of purchase order data sets and goods receipt data sets, the data sets including information about vendors and about goods obtained from the vendors;
a second program code portion for assembling a worklist from the information included in the data sets, the worklist defining a plurality of processing packages, each processing package being associated with an individual vendor and indicating one or more goods obtained from the vendor; and
a third program code portion for processing the plurality of processing packages on the worklist in a batch process using a processor, wherein during the batch process each processing package is processed to generate, in a trade preference processing context, a vendor declaration request for a particular vendor, the vendor declaration request listing the one or more goods obtained from the vendor and prompting the vendor to issue a vendor declaration for the one or more listed goods.

24. The computer program product of claim 23, wherein at least one of the first program code portion, second program code portion and third program code portion is stored on a computer-readable recording medium.

25. A system of data processing, comprising:
a feeder sub-system including an electronic database containing at least one of purchase order data sets and goods receipt data sets, the data sets including information about vendors and about goods obtained from the vendors; and
a processing sub-system coupled to the feeder sub-system, the processing subsystem including a database for storing a worklist derived from the information included in the data sets, the worklist defining a plurality of processing packages, each processing package being associated with an individual vendor and indicating one or more goods obtained from the vendor, and including a processor for processing the plurality of processing packages on the worklist in a batch process using a processor, wherein during the batch process each processing package is processed to generate, in a trade preference processing context, a vendor declaration request for a particular vendor, the vendor declaration request listing the one or more goods obtained from the vendor and prompting the vendor to issue a vendor declaration for the one or more listed goods.

26. The system of claim 25, wherein the feeder sub-system is an enterprise resource planning (ERP) system.

27. The system of claim 26, wherein the ERP component is operable in an online transaction processing (OLTP) mode.

* * * * *